United States Patent
Madrigal Medina et al.

(10) Patent No.: US 9,296,351 B1
(45) Date of Patent: Mar. 29, 2016

(54) CARGO AREA AIRBAG

(71) Applicant: Continental Automotive Systems, Inc., Auburn Hills, MI (US)

(72) Inventors: Saúl Alejandro Madrigal Medina, Tlaquepaque (MX); Jonathan Efren Limon Sepulveda, Guadalajara (MX); Alberto Ruiz, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/495,352

(22) Filed: Sep. 24, 2014

(51) Int. Cl.
  *B60R 21/08* (2006.01)
  *B60R 21/13* (2006.01)
  *B60R 21/013* (2006.01)
  *B60R 21/214* (2011.01)
  *B60R 21/06* (2006.01)

(52) U.S. Cl.
  CPC ............. *B60R 21/08* (2013.01); *B60R 21/013* (2013.01); *B60R 21/06* (2013.01); *B60R 21/13* (2013.01); *B60R 21/214* (2013.01)

(58) Field of Classification Search
  CPC ...... B60R 21/08; B60R 21/06; B60R 21/214; B60R 21/013; B60R 21/13; B60R 2021/23192; B60R 21/026
  See application file for complete search history.

(56) References Cited

U.S. PATENT DOCUMENTS

| | | | | |
|---|---|---|---|---|
| 6,231,072 B1* | 5/2001 | Pywell | ................ | B60R 21/02 280/730.2 |
| 6,349,986 B1* | 2/2002 | Seel | ................ | B60R 5/047 160/265 |
| 6,588,793 B2* | 7/2003 | Rose | ................ | B60R 21/2171 280/728.2 |
| 6,948,736 B2* | 9/2005 | DePottey | ................ | B60R 21/214 280/728.2 |
| 7,918,480 B2* | 4/2011 | Kwon | ................ | B60R 21/214 280/728.2 |
| 8,091,939 B2* | 1/2012 | Forsyth | ................ | B60R 21/12 280/749 |
| 8,452,494 B2* | 5/2013 | Gandhi | ................ | B60R 21/013 280/728.3 |
| 8,505,966 B2* | 8/2013 | Yoo | ................ | B60R 21/214 280/729 |
| 2003/0052476 A1* | 3/2003 | Rose | ................ | B60R 21/2171 280/730.2 |
| 2004/0239084 A1* | 12/2004 | Mori | ................ | B60R 21/214 280/730.1 |
| 2010/0301591 A1* | 12/2010 | Kwon | ................ | B60R 21/214 280/743.2 |
| 2012/0133114 A1* | 5/2012 | Choi | ................ | B60R 21/214 280/728.2 |
| 2015/0203066 A1* | 7/2015 | Pausch | ................ | B60R 21/231 280/730.1 |

* cited by examiner

*Primary Examiner* — Drew Brown

(57) ABSTRACT

A vehicle cargo restraint system is provided for a vehicle having a forward seating area and an interior rearward cargo area. The system includes a pane mounted adjacent an interior roof of the vehicle. An airbag is provided for powering the panel from a position adjacent the roof of the vehicle to a position wherein a portion of the panel is adjacent the forward seating area dividing the forward seating area from the cargo area of the vehicle.

21 Claims, 4 Drawing Sheets

CARGO AREA AIRBAG

FIELD OF THE INVENTION

The present invention is related to cargo restraint systems for automotive vehicles having a forward seating area and a rearward cargo area. The present invention is particularly applicable to car platform base or truck platform base sport utility vehicles.

BACKGROUND OF THE INVENTION

In the chronicles of passenger type automotive vehicles, it has been known to provide various configurations of automotive vehicles wherein there is a forward seating area and a rearward cargo area sharing the same interior enclosure. Examples of such vehicles can be found in hatchback type vehicles wherein the rear seating separating the trunk and the passenger compartment of the vehicle can be folded down to provide for storage of larger items. Another type of vehicle configuration having a forward seating area and a rearward cargo area is the station wagon. In the last three decades, there has been an increasing popularity in car platform base or light truck platform base vehicles commonly referred to as sporty utility vehicles having a forward multiple row seating area and a rearward cargo area that share a common spacial enclosure. When utilizing any of the aforementioned vehicles, often cargo items are placed within the cargo area in a generally unsecured fashion. This is particularly applicable if the cargo involved is grocery items. In a crash situation, or in a rollover, unsecured items in the cargo area of the vehicle can possibly be tossed about and enter into the seating area of the vehicle. It is desirable to provide an apparatus and a method of utilization thereof which will in the aid in the prevention of items within the cargo area of a vehicle from entering into a seating area of a vehicle during exigent situations.

SUMMARY OF THE INVENTION

To make manifest the above noted and other manifold desires, a revelation of the present invention is brought forth. In a preferred embodiment, the present invention brings forth a vehicle cargo restraint system for an automotive vehicle having a forward seating area and a rearward cargo area. A panel is provided adjacent an interior roof of the vehicle. An airbag is provided for powering the panel from a position adjacent a roof of the vehicle to a position wherein a portion of the panel is adjacent the forward seating area dividing the forward seating area from the cargo area of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
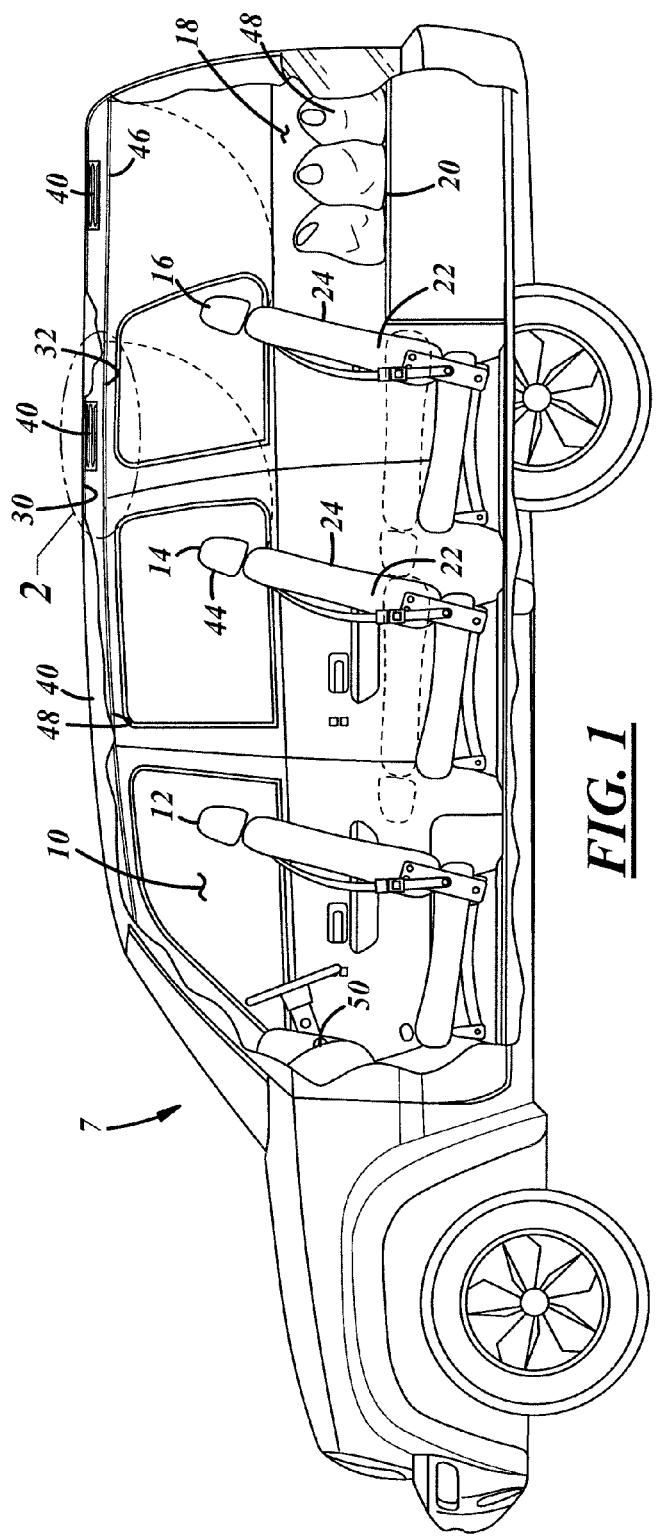
FIG. 1 is a side elevational view partially sectioned of a multi-row seating sport utility vehicle utilizing a vehicle cargo restraint system according to the present invention.
Figure 2:
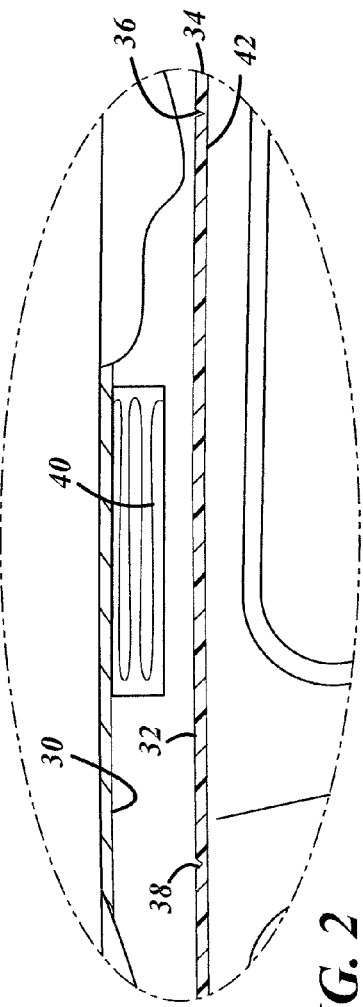
FIG. 2 is an enlarged view of an airbag utilized to deploy a living hinge panel of the vehicle cargo restraint system utilized in FIG. 1.

Referring now to FIGS. 1 and 2, a vehicle 7 incorporating a cargo restraint system of the present invention is provided. The vehicle 7 has a forward seating area 10. As shown, the forward seating area 10 has a first row 12, second row 14, and a third row 16 of vehicle seating; however, the present invention can be utilized in vehicles having a single row of vehicle seating. The vehicle 7 also has a rearward cargo area 18 having a floor 20. The third seating row 16 has a bench or multiple lateral seats with seat backs 22. The seat backs 22 have rear surfaces 24. The rear cargo area 18 can be extended by modifying the third row 16 seating by folding the seat backs 22 forward to a position shown in phantom. In like manner, the second row 14 of seating has seat backs 22 which can be folded forward to a position shown in phantom to further extend the cargo area 18. In most vehicles, the rear surfaces 24 of the seat backs 22 will assume a level that is closely aligned with the level of the floor 20 to provide an even floor for the rear cargo area 18. The forward seating area 10 and the rear cargo area 18 share a common vehicle interior. Mounted adjacent an interior roof 30 of the vehicle is a panel 32. In the embodiment shown in FIGS. 1 and 2, the panel 32 is formed by a portion of the interior roof panel 34. The panel 32, which is part of the cargo restraint system of the current invention, has its major dimensions defined by a V-notch 36. The panel 32 also has a secondary V-notch 38 which extends into the panel 32 at a depth less than that of V-notch 36 to provide a living hinge 38. The panel 32 is typically fabricated from a rigid polymeric material which may or may not be reinforced by a fiberglass or carbon fiber.

Positioned adjacent the roof 30 of the vehicle 7 is an airbag 40. The airbag 40 can be deployed upon sensing of a crash condition with the vehicle 7. In some embodiments, it may be desirable that the airbag 40 will only deploy upon a sensing of not only a crash condition, but additionally a pending, or actual rollover condition of the vehicle during a crash situation. Upon the appropriate signal, the airbag 40 is deployed causing a rapid expansion causing the panel 32 to be torn out about the V-notch 36 and pivot about the living hinge 38. A portion 42 of the panel 32 will now be pivoted to a position adjacent the forward seating area. Typically, portion 42 will contact the seat back 22; however, in some embodiments, it may be desirable for the portion 42 to contact the head restraint 44.

Longitudinally spaced from panel 32 is another panel 46. Panel 46 also has an airbag 40 for powering it to pivot down to provide a cargo restraint. Spaced longitudinally forward of panel 32 is another air bag deployable panel 48.

In a crash or impending vehicle rollover condition, typically the control system for the cargo restraint system will only activate panel 46 whenever the seating in the second row 14 has the seat back 22 in an upright position. Accordingly, in a rollover condition, panel 46 will be pivoted downward until contacting the seat back 22 of the seating row 16. This will provide a barrier for any cargo, especially loose items which may be contained in grocery bags 48. Accessible to the vehicle driver is a control button, and optionally, an indicator light 50 that alerts the driver of the vehicle that the cargo restraint system is functional. The control button and indicator light 50 will also allow the vehicle operator to deactivate portions or all of the cargo restraint system. This feature may be particularly applicable when the vehicle 7 is being utilized to transport a large pet, such as a large dog and thereby prevent the dog from being injured by the pivoting panel 46. Between the panel 46 and panel 32 and between the panel 32 and panel 48, typically there will be some form of reinforcement for the interior roof panel 34 to prevent the portions of the roof panel which are not forming the pivoting panels from collapsing whenever a panel is deployed. Typically the control system for the cargo restraint system will automatically disable deployment of panel 48 upon the seat back 22 in second seating row 14 or third seating row 16 being placed in an upright position. In like manner, the control system will automatically deactivate panel 32 upon the seat back in third seating row 16 being positioned in an upright position. If seat backs 22 for the third seating row 16 and the second seating row 14 are in a folded down position (as shown in phantom), the panel 48 will automatically be activated in an exigent situation. Deployment of panels 32 and 48 are optional.

Figure 3:
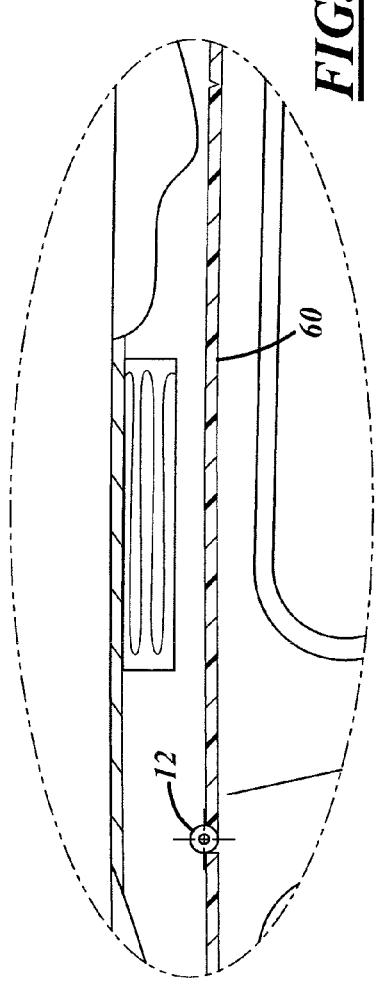
FIG. 3 is an alternate preferred embodiment illustrating the utilization of a pivotal hinge panel in a vehicle cargo restraint system according to the present invention.
Figure 4:
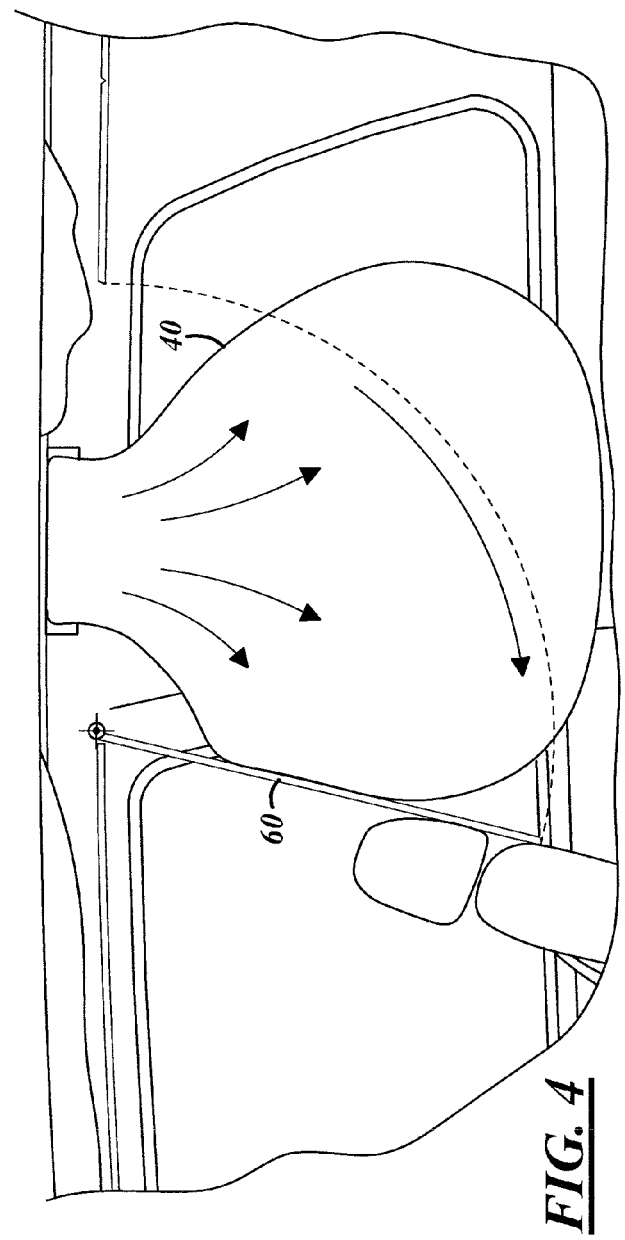
FIG. 4 illustrates deployment of the airbag with the panel being pivoted forwardly by an obtuse angle positioned to have a portion of the panel adjacent to and contacting a seat in a seating area in a cargo restraint system according to the present invention.

Referring to FIGS. 3 and 4, an alternate preferred embodiment panel 60 is provided. Panel 60 is similar to panel 32 as previously described however, panel 60 has a pivotal hinge 62.

Figures 5, 6:
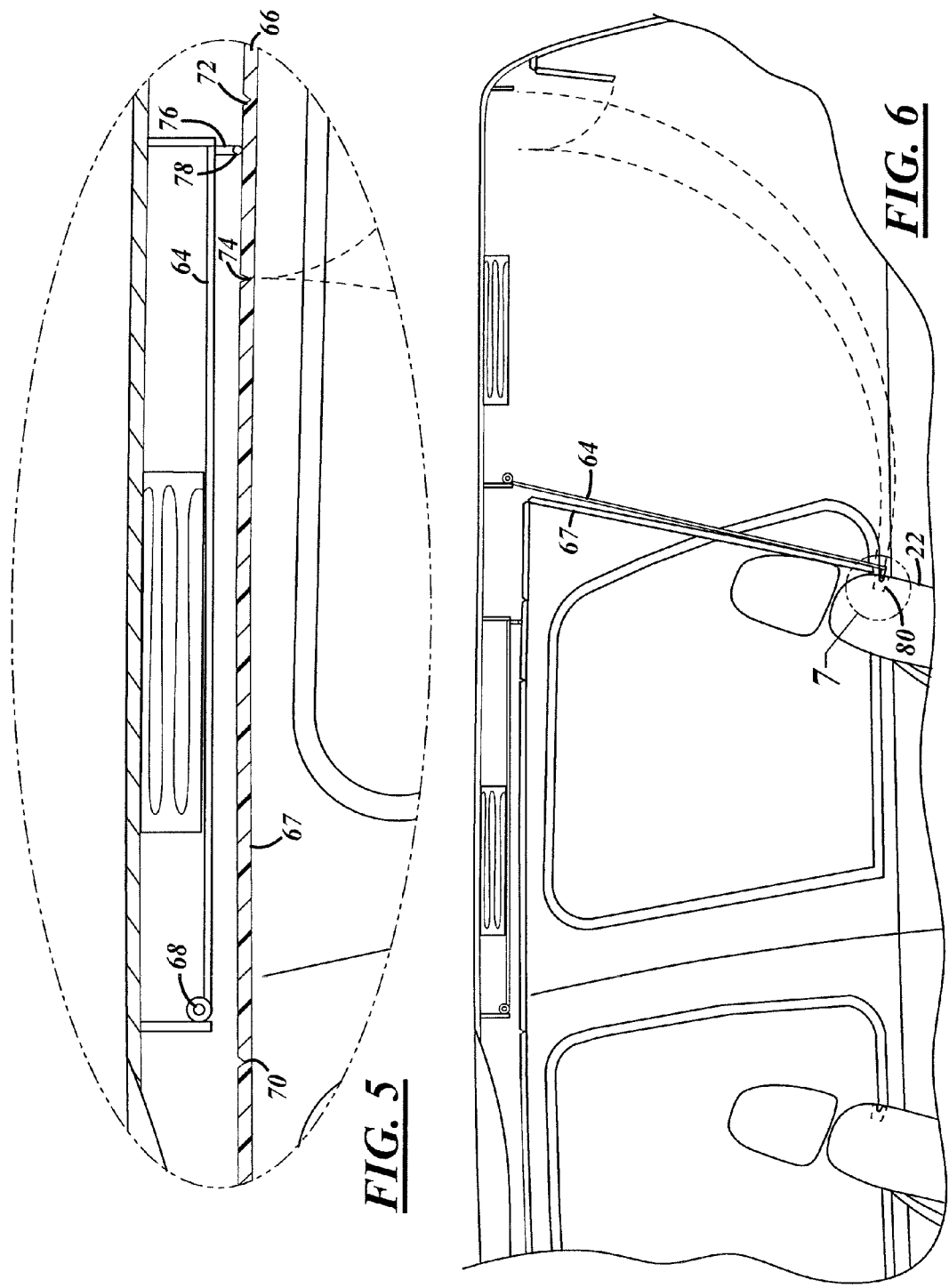
FIG. 5 illustrates another preferred embodiment of the present invention illustrating multiple deployment of a vehicle cargo restraint system wherein the panel is concealed by an interior roof panel.
FIG. 6 illustrates deployment of the vehicle cargo restraint system of FIG. 5.
Figure 7:
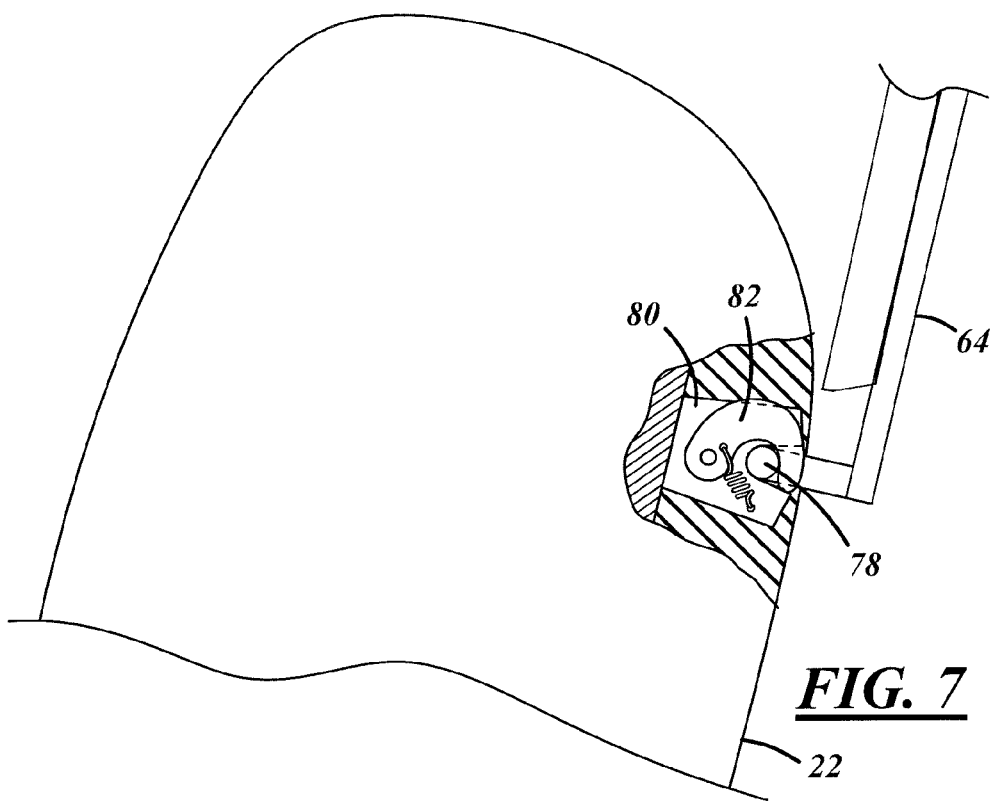
FIG. 7 is an enlarged inside elevational view of the vehicle cargo restraint system shown in FIG. 6 with a latching system wherein a larger portion of the latch system is concealed within the vehicle seat.

FIGS. 5, 6, and 7 illustrate still another alternative embodiment of the present invention wherein the panel 64 is separate from the roof panel 66. Panel 64 has a pivotal hinge 68. The interior roof panel has living hinge 70, 72 with a breakout notch 74. Since panel 64 is concealed by the roof panel 66, the design of the cargo restraint system of FIGS. 5 and 6 has greater freedom of design and materials utilized for the panel 64. Additionally, in configuration shown, the roof panel portion 67 provides a secondary panel which can be relied upon as the main barrier allowing panel 64 to be a non-solid barrier structural member or for panel 64 to be a complete panel member providing a dual barrier upon deployment. Panel 64 additionally has a leg 76 with a transversely laterally extending striker pin 78. The striker pin 78 is captured by a latch 80 recessed within the seat back 22 causing the panel 64 to latch to the seat back 22. This causes the panel 64 to remain in its desired cargo restraining position even if the vehicle suffers multiple rollover events.

FIG. 7 is an enlargement of the latch 80 shown in FIG. 6 which captures the striker pin 78. The latch 80 has a spring loaded clamp 82 which captures the pin 78 upon its engagement with the latch 80 to securely hold the panel 64 to the seat back 22.

Figure 8:
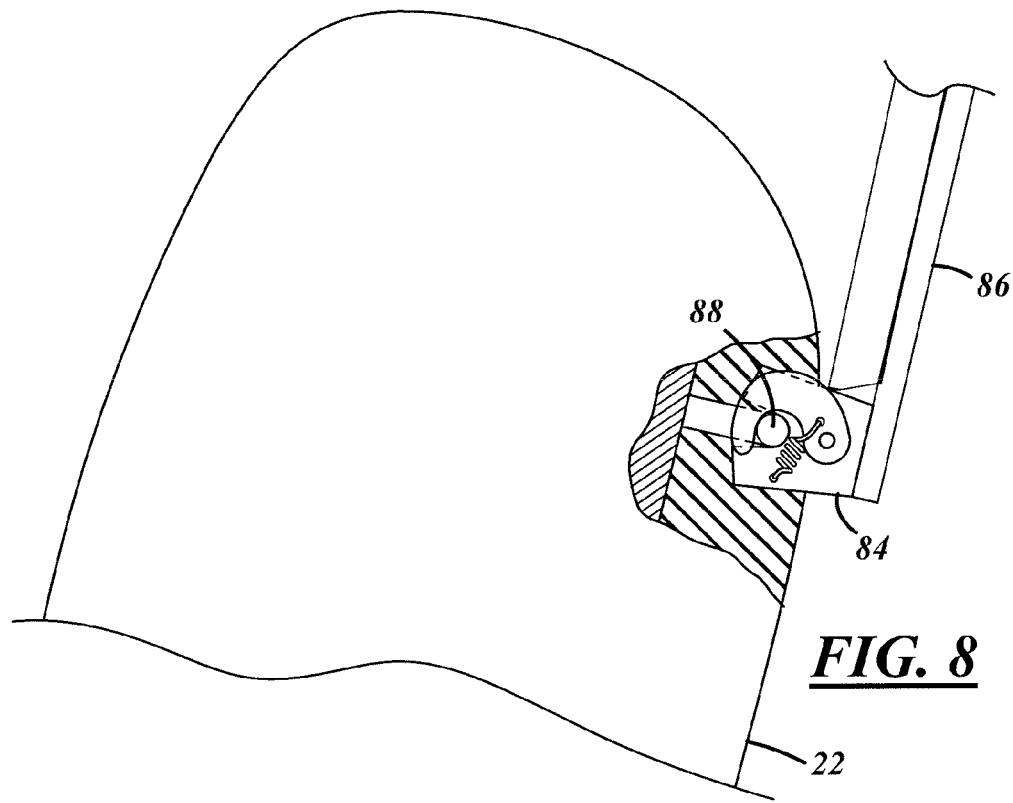
FIG. 8 is another alternate preferred embodiment of the present invention wherein a large part of the latch system is connected with the vehicle panel and a latch striker is concealed within the vehicle seat.

FIG. 8 is an alternate preferred view wherein a latch 84 is connected with a panel 86 which captures a striker pin 88 provided within the seat back 22 to latch the panel 86 with the seat back 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle cargo restraint system for a vehicle having a forward seating area and an interior rearward cargo area, said system comprising:
   a panel mounted adjacent an interior roof of said vehicle; and
   an airbag for powering said panel from a position adjacent said roof of said vehicle to a position wherein a portion of said panel is contacting a seat of said forward seating area dividing said forward seating area from said cargo area.

2. A vehicle cargo restraint system as described in claim 1 wherein said panel is fabricated from a rigid polymeric material.

3. A vehicle cargo restraint system as described in claim 1 wherein said panel has means of latching with a vehicle seat within said vehicle seating area when said panel has been deployed by said airbag.

4. A vehicle cargo restraint system as described in claim 1 wherein said panel forms a portion of an interior roof panel of said vehicle.

5. A vehicle cargo restraint system as described in claim 1 wherein said panel is concealed by an interior roof panel of said vehicle.

6. A vehicle cargo restraint system as described in claim 5 wherein said interior roof panel forms a secondary panel.

7. A vehicle cargo restraint system as described in claim 1 wherein said vehicle has at least first and second rows of seating and said cargo space can be extended by modifying said second row of seating and wherein there is at least first and second longitudinally spaced panels mounted adjacent said interior roof of said vehicle.

8. A vehicle cargo restraint system as described in claim 7 wherein when said second row of seating is not modified to extend said cargo area, said first panel is disabled.

9. A vehicle cargo restraint system as described in claim 1 wherein there is an operator controlled switch for deactivating said vehicle cargo restraint system.

10. A vehicle cargo restraint system as described in claim 1 wherein said panel has a living hinge.

11. A vehicle cargo restraint system as described in claim 1 wherein said panel has a pivotal hinge.

12. A vehicle cargo restraint system as described in claim 1 wherein said portion of said panel is pivoted forwardly along an obtuse angle for contacting said seat.

13. A method of restraining cargo items in a rearward interior cargo area of a vehicle from a forward seating area during an exigent event comprising:
   mounting a panel adjacent a roof of said vehicle;
   signaling an existence of an exigent event; and
   deploying an airbag in response to said signaling to position a portion of said panel contacting a seat in said seating area to separate said cargo area from said seating area to inhibit travel of items within said cargo area from passing into said seating area.

14. A method as described in claim 13 further comprising latching said panel with a seat within said seating area to maintain the position of said panel separating said cargo area from said seating area.

15. A method as described in claim 13 further comprising signaling said cargo restraint system based upon a sensing of a rollover incident.

16. A method as described in claim 13 further comprising signaling said system of an exigent situation based upon a sensing of a crash of said vehicle.

17. A method as described in claim 13 further comprising preventing a deployment of said panel based upon a seat being in an upright position when said seat is in an extendable portion of said cargo area.

18. An automotive vehicle comprising:
a frame providing an enclosure with a forward seating area and a rearward interior cargo area;
a panel mounted adjacent an interior roof of said vehicle; and
an airbag for powering said panel from a position adjacent said roof of said vehicle to a position wherein a portion of said panel is adjacent said forward seating area dividing said forward seating area from said cargo area; and
wherein said vehicle has at least first and second rows of seating and said cargo space may be extended by modifying said second row of seating and wherein there is at least first and second longitudinally spaced panels mounted adjacent said interior roof of said vehicle with air bags for powering said respective panels.

19. A vehicle as described in claim 18 wherein when said second row of seating is not modified to extend said cargo area, said first panel is disabled.

20. A vehicle as described in claim 18 wherein there is an operator controlled switch for deactivating said airbag.

21. A method of restraining cargo items in a rearward interior cargo area of a vehicle from a forward seating area during an exigent event; comprising:
mounting a panel adjacent a roof of said vehicle;
signaling an existence of an exigent event;
deploying an airbag in response to said signaling to position a portion of said panel adjacent a seat in said seating area to separate said cargo area from said seating area to inhibit travel of items within said cargo area from passing into said seating area; and
preventing a deployment of said panel based upon a seat being in an upright position when said seat is in an extendable portion of said cargo area.

* * * * *